(12) United States Patent
Ohana et al.

(10) Patent No.: US 11,182,808 B2
(45) Date of Patent: Nov. 23, 2021

(54) METHOD AND SYSTEM FOR ATTRIBUTES BASED FORECASTING

(71) Applicant: Target Brands, Inc., Minneapolis, MN (US)

(72) Inventors: Brian Ohana, Minneapolis, MN (US); Deepak Kumar, Karnataka (IN); Vinay Sathyan, Karnataka (IN); Aishwarya Shukla, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 183 days.

(21) Appl. No.: 16/268,182

(22) Filed: Feb. 5, 2019

(65) Prior Publication Data

US 2020/0250688 A1 Aug. 6, 2020

(51) Int. Cl.
*G06Q 30/02* (2012.01)
*G06F 16/215* (2019.01)
*G06Q 10/06* (2012.01)

(52) U.S. Cl.
CPC ....... *G06Q 30/0202* (2013.01); *G06F 16/215* (2019.01); *G06Q 10/067* (2013.01)

(58) Field of Classification Search
CPC combination set(s) only.
See application file for complete search history.

(56) References Cited

U.S. PATENT DOCUMENTS

| | | | |
|---|---|---|---|
| 5,314,094 A | 5/1994 | Dalske et al. | |
| 5,712,985 A * | 1/1998 | Lee | G06Q 30/0202 705/7.31 |
| 6,609,101 B1 * | 8/2003 | Landvater | G06Q 10/06 705/7.25 |
| 7,155,402 B1 * | 12/2006 | Dvorak | G06Q 10/06315 705/14.41 |
| 9,818,063 B2 | 11/2017 | Joshi et al. | |
| 2002/0169657 A1 * | 11/2002 | Singh | G06Q 10/06 705/7.31 |
| 2009/0192855 A1 * | 7/2009 | Subramanian | G06Q 30/0202 705/35 |
| 2011/0238461 A1 * | 9/2011 | Mulukutla | G06Q 10/04 705/7.31 |
| 2018/0039897 A1 * | 2/2018 | Joshi | G06N 5/04 |

FOREIGN PATENT DOCUMENTS

JP 05314094 A 11/1993

* cited by examiner

*Primary Examiner* — Arif Ullah
(74) *Attorney, Agent, or Firm* — Merchant & Gould P.C.

(57) ABSTRACT

Methods and systems for analyzing trends in sale data for a retail enterprise are described. A retail analysis platform includes a data extraction and analysis automation platform, a feature transformation application, a modeling environment, and a dashboard application. Analysis begins with recent sales data. Baseline sales for the retail enterprise are removed from the recent sales data. Then the effects of seasonality and local disruptions are removed by utilizing different weights of driver data for each item category and store location. This top down approach results in more accurate reporting of sales trends and attribution of deviations from demand forecasts to particular drivers. The analysis can be scheduled to automatically initiate on a regular basis.

21 Claims, 14 Drawing Sheets

600

602

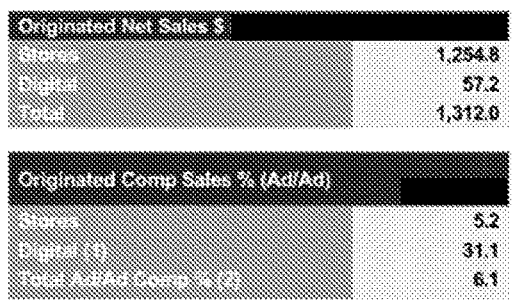

Weekly Key Performance and Marginal Effects
(October week 5, FW 44, 2018)

Sales This Week

| Forecast Drivers | Attribution Highlights |
|---|---|
| Weather: Temperatures are expected to be lower than normal in the Midwest. For this upcoming week this is expected to reduce overall sales for stores in this region. Seasonal clothing sales are expected to increase. | Halloween candy sales were up this year. Having the holiday land on a Friday seemed to have boosted sales.

Temperatures were warmer in the Midwest region compared to last year. This resulted in overall lower sales. This is attributed to the fact that people typically do less shopping when there is unseasonably warm weather in October. |
| Remodel: 5 stores will be concluding their remodels this week and we can expect to start seeing some lift in sales at those stores. | 45 stores are still experiencing disruption due to remodel activity this week. The drop in sales at these stores is comparable to what we have experienced in the past. |

FIG. 14

METHOD AND SYSTEM FOR ATTRIBUTES BASED FORECASTING

TECHNICAL FIELD

The present disclosure relates generally to methods and systems for analyzing trends in sales performance. More specifically, methods and systems are provided for attributing deviations from predicted sale performance to one or more drivers.

BACKGROUND

Decision makers for a retail enterprise need to have the most accurate forecasts possible. Forecast information is utilized to inform important decisions that affect everything from personnel planning, inventory planning, setting prices, and placing orders from vendors. One important task of decision makers is to determine whether strategic activities have positive or negative effects on sale performance.

Current methods of analyzing sales performance rely on many disparate sources of information. Existing computing systems can provide some analysis of such data to determine trends in sales performance. However, these existing solutions are limited to examining either sales performance of individual items or overall retail chain sales. To achieve analysis of groupings of items or retail locations, the sales performance of the individual items are aggregated. In other words, the sales data is analyzed in a "bottom up" approach. At the aggregate (enterprise-wide) level, such bottom-up forecasting and analysis techniques prove inaccurate and incapable of accurately determining drivers of sales or predictions of sales performance.

Another drawback of existing systems is that they cannot distinguish individual causes of sales performance shifts independent from typical sales patterns for a particular store or class of goods. Deviations from expected sales performance are examined manually to compare fluctuations with various other sources of data about external factors to try to determine the cause. Often times, experience and "gut" are the main ways that deviations are attributed to various causes. These methods, even when aided by computing systems, are time consuming and labor-intensive.

A model is needed that can distinguish the effects of strategic initiatives from the effects of seasonality and uncontrollable influences on sales. A further need is for analyses to be conducted in an automated fashion.

SUMMARY

In summary, the present disclosure relates to methods and systems for evaluating item demand forecasts for a retail context. Various aspects are described in this disclosure, which include, but are not limited to, the following aspects.

In a first aspect, a method of identifying sales trends in a retail enterprise is provided. The retail enterprise includes a plurality of retail stores that sell items in a plurality of item categories. Driver data is received at a landing table within a computing system from a plurality of disparate, heterogeneous data sources. The driver data is indicative of internal and external effects on sales at one or more retail stores from among the plurality of retail stores. The driver data includes historical sales data. At a predetermined time, a sales analysis process is automatically initiated within the retail analysis platform. The sales analysis process includes: extracting and cleaning the driver data within an automatic data transformation environment, to produce final input data; determining, from the final input data, and across the retail enterprise, baseline sales for a given time period at one or more of the plurality of retail stores, wherein the baseline sales are broken down into each of the plurality of item categories; removing the baseline sales from recent sales data; adjusting final input data to remove seasonal influences, wherein the seasonal influences are predictable based on historical sales data; adjusting final input data to remove influences of localized disruptions; and extracting a trend for each of the item categories from final input data after the seasonal influences and localized disruptions have been removed. A demand forecast is then accessed for the given time period. Trends are automatically analyzed to identify quantifiable factors attributable to deviations from the demand forecast for the given time period. A report is automatically generated which indicates the quantifiable factors applicable within the given time period. In some embodiments, the method further includes modifying a demand forecast for a future time period based on the quantifiable factors and driver data relevant to the future time period, to produce an updated demand forecast. In some embodiments, the updated demand forecast prompts the adjustment of at least one of inventory level, price, inventory location, or personnel level.

In a second aspect, a system is provided for analyzing trends in sales data for a retail enterprise that includes a plurality of retail stores. The system includes a retail analysis platform that includes a processor communicatively connected to a memory. The memory includes a data extraction and analysis automation platform that includes a scheduler and a data extraction and cleaning application. The data extraction and cleaning application is called by the scheduler to apply one or more data organization and cleaning processes to data received in landing tables accessible to the data extraction and analysis automation platform, the data being from a plurality of internal and external data sources and including driver data and historical sales data, the driver data reflecting drivers affecting sales at one or more retail locations from among the plurality of retail locations. The data extraction and analysis automation platform further includes a feature transformation application configured to correlate the driver data to the historical sales data across all of the plurality of retail locations to form processed data. The retail analysis platform further includes a modeling environment configured to receive the processed data from the data extraction and analysis automation platform. The modeling environment includes a model engine and a solver. The model engine is configured to generate, from historical sales data for a relevant period of time, one or more trends associated with items sales at one or more of the retail locations, the one or more trends being identified in response to extraction of baseline sales and at least one of seasonality adjustments and localized disruptions based on the driver data. The solver is configured to, based on the model engine and driver data for the relevant period of time, generate a prediction of sales for at least some of the retail locations for a future period of time. The system further includes a dashboard application configured to receive an input defining the relevant period of time and a selection of the one or more retail locations and provide a display indicating at least one of the prediction of sales or the one or more trends.

In a further aspect, a retail enterprise system including a plurality of geographically dispersed retail stores in communication with a retail enterprise computing is provided which includes a retail analysis platform. The retail analysis platform is configured to receive quantifiable internal driver data and external driver data from a plurality of heterogeneous driver data sources, the driver data being quantifiable data that affects sales performance for the plurality of geographically dispersed retail stores. Item data is received from an inventory data store and sales data is received from a sales data store, the sales data comprising historical sales data and recent sales data for a given time period. A demand forecast is received for the given time period. The internal driver data, external driver data, sales data, item data, and demand forecast are processed to produce a trend report. The recent sales data is broken down and a unique model is applied to each combination of location and item category. Each unique model operates to: remove the effects of seasonal changes in sales, based on the historical sales data and quantifiable driver data; remove the effects of localized disruptions, based on the internal and external driver data; and producing a trend report after the baseline sales, seasonal changes, and localized disruptions are removed from the recent sales data for each combination of store location and item category. The retail enterprise system further includes a strategic planning platform that includes a planner dashboard. The strategic planning platform is in communication with one or more administrator computing devices. The strategic planning platform is configured to: receive trend reports from the retail analysis platform; display visualizations of the trend reports on the planner dashboard; receive instructions from the administrator computing devices to modify a strategic plan for the retail enterprise; communicate instructions to one or more of a supply chain manager, a pricing manager, and a labor manager to implement changes to the strategic plan; and communicate feedback to at least one of a developing and testing environment and a demand forecaster.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 14 illustrates an example of a report generated for a given week.

DETAILED DESCRIPTION

Figure 1:
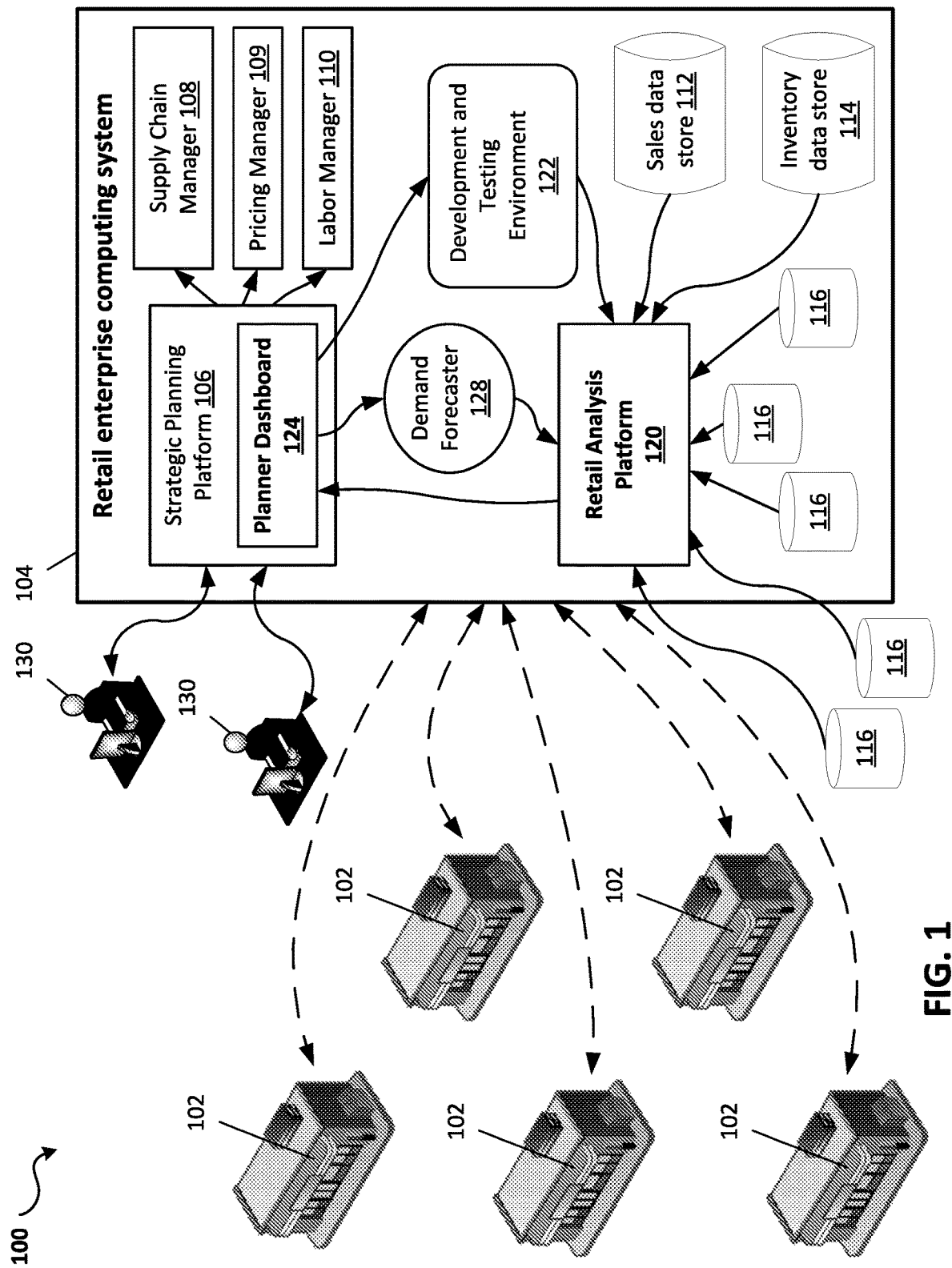
FIG. 1 illustrates a schematic diagram of an example retail enterprise system useable to manage a plurality of retail stores within a retail chain.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present methods and systems operate to analyze high level trends in sales data. The effects of seasonality and local disruptions are eliminated from the sales data to determine trends for weekly sales. The sales data is broken down by merchandise categories and individual stores. This produces reports for each week to identify factors that resulted in sales performance numbers deviating from what was predicted.

Deviations from expected sales performance are attributed to drivers. Drivers are factors that influence sales and can be quantified from data received from internal or external sources. Normal baseline sales for a given time period are determined and are removed from consideration. Then fluctuations in sales due normal seasonal changes over the course of a year are removed. The remaining fluctuations and sales performance reflect other disruptions. The methods and systems described herein rely on automated execution of models that perform top-down analysis of driver data to identify disruptions to sales performance in a given week. These disruptions are then attributed to one or more quantifiable drivers. This method allows for prediction of performance based on season, weather, events, promotions, and the like that are expected in the future.

Multiple data inputs are received to analyze drivers that affects sales. Unique combinations of drivers are identified and weighted for each category of products. In addition, seasonal trends and local disruptions are identified that affect sales. These inputs are used to model data to determine the trends for the week. First, seasonal factors are removed from the sales data. Then local disruptions are removed. This leaves any additional sales data to be compared with the predicted sales. Any discrepancies are attributed to trends for the week.

This process is unique in the inputs considered as well as the automated nature of the modeling. Previously, numerous individuals weighed in on sales trends based on various information sources and, to some extent, "gut feelings." This automated process produces weekly reports that can be tweaked and analyzed by the finance team to inform decisions for later weeks and inform future sales predictions. Still further, such generated trends may be used to take actions regarding forecasted performance, for example to adjust one or more inventory levels, purchasing trends, shipment timing, or other physical actions.

Methods of the present disclosure focus on a class or category of items at the store level as the unit of measure. Classes or categories of items can include, for example, women's clothing, produce, or electronics. The store level refers to examining individual retail stores' performance. The methods of the present disclosure also focus on a particular time dimension, as all initiatives have a temporal aspect. Some sales initiatives can have a very short duration such as limited-time offers, while others are designed to continue in perpetuity. For purposes of the example methods described herein, a week has been determined to be an appropriate time period for examining sales trends. This duration allows for smoothing out of variability and daily sales while maintaining sufficient amounts of data to model an overall effect.

The disclosed systems and methods can be utilized to examine sales performance for various combinations of origination and fulfillment. The most common channel of the retail business is store originated and store fulfilled sales. Other channels can include online originated and store fulfilled sales, online originated and delivered to customer sales. One challenge of digital sales is understanding localized performance. For purposes of the methods described herein, digital sales are attributed to retail stores based on zip code.

Data Inputs

A plurality of driver data sources are utilized to obtain information about factors that influence sales. These factors can be under the control of the retailer or be external events outside of the control of the retailer. Some of the external influences on sales can be predicted based on seasonal changes specific to the location in which a retail store is located. Some disruptions can be anticipated based on scheduled local events or activities under the control of the retailer.

A seasonal index is calculated at the retail chain level for each category of items by extracting seasonal components from STL time series technique. Seasonal factors are considered first. Seasonal factors can include holidays, vacation seasons, and back to school periods of time. Seasonal factors can have chain-wide effects or be specific to particular geographic areas.

Some holidays occur on a specific date and therefore a different weekday each year. Each is currently coded with a value of "1" for the week of the holiday and a value of "0" for all other weeks. Each holiday is treated as a separate moment to capture the specific impact for that specific holiday. This can be problematic as the number of days that precede the holiday can meaningfully change the impact registered by year. In the future, the model intends to refine these inputs to more accurately represent the impact. In some cases the stores are closed on the specific holiday further complicating how these are represented. Examples of moving weekday holidays included are: week of Valentine's Day (Feb 14th); week of Christmas; week of New Year's Day; and week of Halloween.

Some holidays occur on the same week day every year and may only change the exact fiscal week from year to year. Each is coded with a value of "1" for the week of the holiday and a value of "0" for all other weeks. Each holiday is treated as a separate moment to capture the specific impact for that specific holiday. Example holidays included are: Pre-Easter (moves from year to year); week including Easter; week prior to Mother's Day; week including Memorial Day; week prior to Father's Day; Week of Independence Day; week of Halloween; and week including Black Friday.

For the weeks between but not including Thanksgiving and Christmas there is typically a gradual increase in sales activity starting the week after Thanksgiving (lower than the week of Thanksgiving itself) and growing and peaking the week prior to Christmas. We treat this as a monotonically increasing series and represent the week after Thanksgiving with a value of "1" and each subsequent week as prior week+1. All other weeks are represented with a value of 0 to ensure the model only represents this time period.

Back to school is often quite specific to a store. However, to ensure we capture some aspect of back to school, every fiscal week in August is given a value of "1" all other months set to "0". The team has backlog goals to review the experience specific to stores that have poor fit during this time period.

Back to college is often quite specific to a store. However, to ensure we capture some aspect of back to college, every fiscal week in July/August is given a value of "1" all other months set to "0". The team has backlog goals to review the experience specific to stores that have poor fit during this time period.

Summer resort and vacation spots—opposite of snowbird stores these stores are typically near beach towns or are high traffic tourist towns. Many beach towns have elevated sales in the spring during spring break time and prolonged higher sales in summer months. Some more resort towns like Door County Wisconsin and Lake Geneva Wisconsin receive more traffic in summer when tourists visit cabins. The beach towns are quiet in the winter due to colder waters and northern resort towns are frozen.

Snowbird Season—some stores especially in Florida have an inverted quadratic spend curve with most spend in winter and less in summer. This happens as residents from colder northern states migrate south for the winter. The heaviest location for this is the west coast of Florida near Naples and Fort Myers.

Promotional sales over net sales. Both sales values are taken from SSAS cubes at class/location/week level.

Clearance sales over net sales. Both sales values are taken from SSAS cubes at class/location/week level.

Digital sales over net sales. Both sales values are taken from SSAS cubes at class/location/week level.

The second phase removes the effects of driver data related to localized disruptions. One example of a localized disruption is remodeling.

Mobilization intensity: This is the time period at which time construction begins through the grand re-opening of the impacted store. The expectation is this is a time of disruption and has a negative impact on Target performance. Currently this measure begins with a value of "1" on the week of mobilization. The value increments by 1 each week thereafter to represent the monotonically declining sales through construction and returns to "0" the week after the store grand re-opening.

Transition intensity: This is the time immediately at and following the grand re-opening. It is marked by a period of fluctuation both in positive terms ("newness") and negative terms (unfinished work). This metric is distinct from the steady state lift that is the primary measure of post-remodel value. The metric is currently a value of "1" the week of the grand re-opening and increments by 1 for the two following weeks.

Operate intensity: After the launch period is complete it is hypothesized that stores reach a new normal and that new normal is some degree better than the pre-remodel performance. To capture this a crude metrics is used to indicate post-remodel normal starting the 3rd week post grand re-opening. For this metric a value of "0" is set until the 3rd week post grand re-opening and changes to "1" on that 3rd week. The value remains "1" for all subsequent weeks.

Other localized disruptions can include effects related to weather such as precipitation levels, temperature fluctuations, and severe weather events. Total precipitation aggregated at weekly level from daily weather data which is at store—zip level. Total snow aggregated at weekly level from daily weather data which is at store—zip level. Average weather index aggregated at weekly level from daily weather data which is at store—zip level.

Pre and post storm: spike up in sales before and after storm. Core weather events are wide scale disruptions that cause stores to lose sales for a couple days as streets are not navigable. Some stores have more prolonged issues as the store is shut down—in these cases some sales are transferred to nearby stores. In some cases there is a spike upward before the storm due to forecast alerts and no drop as the storm fails to materialize. In some cases the spike down from the disruption is followed by an offsetting spike up the next week due to guests restocking.

Local events can cause disruptions to normal patterns in sales performance for one or more retail store locations. From time to time there is a disturbance that is often political in nature or related to a sporting event. This causes a store to be closed or to be hard to access for a day or two. On occasion there is damage to a store that impacts business for prolong periods of time.

Some driver data reflects shifts in demand due to opening and closing of stores within the retail chain or from competition by other stores. Cannibalized sales and sales transfers with Target store opens and closures often generating a step function change. The new opened store receives a portion of the sales but does generate its own incremental lift. To measure incremental lift this calculated transfer dollars would need to be subtracted from the newly opened store sales. Competitor impacts: at times a competitor store opens in proximity to Target and has a step function impact to the sales in that store. Also at times a competitor store closes permanently or for a short period of time generating an increase in our sales.

Economic Hits—at times a localized impact occurs when a business closes its doors or layoffs occur in mass. Opposite positive events can happen as well. The first one found is when DuPont laid off 2000 workers in Delaware when they merged with Dow Chemical. This is the biggest employer in Delaware and the effect was sudden and trickled throughout the northern part of the state.

Other driver data specific to the situation of a particular retail chain or subset of retail store locations can be included to more accurately reflect the influences on sales for those stores.

Algorithms/Models
Elastic Net Regression

In some examples, the model methodology deployed for the first stage model is an elastic-net regression (using the GLMNet package in R). Elastic-net regression enables regression of the outcomes with a large volume of factors while controlling for the over-fitting of the marginal effect estimators (Betas) through penalization techniques.

Briefly, elastic-net balances the blend of two alternative regulated regression techniques, each having strengths and limitations. The first technique, Ridge Regression is a mechanism to continuously shrink the estimated marginal effect of the considered factors increasing model stability and prediction accuracy. However, the technique results in the retention of every factor, even insignificant ones. Thus Ridge Regression models become highly difficult to interpret and penalize meaningful factors in exchange for retaining less meaningful factors. The degree of penalization is characterized by a factor $L_2$ consisting of an array of values $\alpha$ aligned to factors $X_p$. The $L_2$ regularization encourages the sum of squares of the factors $([\alpha\beta Xp]-y)^2$ to be small reducing the variability aligned to highly volatile factors.

Alternatively LASSO also penalizes marginal effects but has the effect of selecting and penalizing the core factors that impact the outcome while ignoring factors that are highly correlated to selected core factors. LASSO is characterized by an Li regularization that sub-selects penalized factors using value $\gamma$. However, LASSO models are limited to no more factors than observations and can sacrifice valuable information.

Elastic net is an exercise of balancing the penalization factor a and the sub-selection strength of the penalty $\lambda$. Finding the right balance requires ad-hoc investigation or an analyst provided logic for selecting the appropriate balance between penalization and factor inclusion. When $\alpha=0$ all factors are included and penalized and the model acts as a Ridge Regression. When $\alpha=1$ all non-fully penalized factors are included and acts as a LASSO.

The Application of Elastic-Net Regression in Stage One Model

The first stage model intends to use as much data as possible as long trend cycles, seasonality, and disruptions require as much experience to normalize these effects without being sensitive to a specific year anomaly.

The second consideration is whether the model should execute for each store independently or in some aggregation. ProfX originally executed the first stage model by consolidating like stores into clusters.

There are limitations at the outset of the model that exclude specific stores due to lack of data. For a first stage model to execute a store must have at least 30 observations. This is deployed as the volatility of a store's experience is not expected to be modeled with accuracy until that quantity of data exists.

The current values of $\alpha$ and $\lambda$ are set using an initial starting point for most models. For the main three core models (store sales, transactions, and basket size) we explore alternative measure of $\alpha$ and $\lambda$ using a grid search. The current limitation to apply the grid search to all metrics is specifically the ability to execute the grid search efficiently for every store for every model and meet the SLA requirements. Initiatives exist to remove this barrier in the future. When a grid search is not used a value $\alpha$ is set by default at 0.5. Meaning our current version mimics an artificial balance between the Ridge and LASSO techniques. Thus, we sub-select only input factors that are significant from the universe of potential metrics for each store but do not over-restrict the selection to ensure we capture as much information as is meaningful.

The R package does not specify the value $\lambda$. The package generates its own sequence of results (derived $\beta$ values for each X variable and a resulting model fit) at various values of $\lambda$ using the data and the input factors.

Model Fit Measurement

To measure the effectiveness of the model, a measure of fit is required. In addition the model should be evaluated after splitting the file into training and test samples. All the of above methodologies are applied to 70% of the available data for each store. The purpose of sub-setting the sample is to measure model fit using data not included in the modeling. Thus the models are built on 70% of the data—selected at random. Performance is measured using the mean squared error calculation. The resulting model is then applied to the remaining 30% to derive a second mean square error.

To be considered a "good fit" we presently require a store to reach >=0.60 mean square error on the training 70% and >=0.40 mean square error on the test sample. These thresholds are arbitrary and we expect to increase the thresholds of acceptance as more data becomes available.

MSE (Mean Square Error)

In the regression setting, the most commonly-used measure is the mean squared error (MSE), given by $$MSE = \frac{\sum_{i=1}^{n}(A_i - F_i)^2}{n}$$

The error is the amount by which the value implied by the estimator differs from the quantity to be estimated. The difference occurs because of randomness or because the estimator doesn't account for information that could produce a more accurate estimate. It penalizes larger errors because squaring larger numbers has a greater impact than squaring smaller numbers. The MSE is the sum of the squared errors divided by the number of observations. Therefore, regression adjusts the coefficients of independent variables to get lower MSE.

Alternative Measures of model fit are described below.

Neural Net Methodology builds a blended ensemble of 2 nets. The first net tells you the sales by virtue of a store being open at a particular point in time. The second net tells you sales as a function of independent variables (including an independent variable which is the dependent from net1).

The first net is an LSTM to model sales as a time series. The model is trained on older data and validated on more recent data. The second is a feed forward neural net which takes in independent variables.

GLMNet 1-Stage vs. 2-Stage Modeling is a comparison between one-stage and a two-stage model for transactions.

The application of ARIMA (Auto Regressive Integrated Moving Average) in Stage One model is used to choose the best model for each store. Post this step, we forecast the sales for each store for each week. The forecasted sales are compared with those obtained from using ARIMA with predicted sales from GLMNet and actual sales value.

In most cases, the best model selected for each store by auto.arima( ) is AR(1) model. The forecasted sales of auto.arima( ) does not match well with actual sales value. GLMNet provided better prediction of sales when compared to ARIMA.

The auto.arima( ) function in R uses a variation of the Hyndman and Khandakar algorithm which combines unit root tests, minimization of the AICc and MLE to obtain an ARIMA model. The algorithm follows these steps.

Backward Attribution

The first stage (quantifying seasonality) of the two step approach is to analyze and quantify these factors. Measures that quantify the four key factors are modeled against the outcomes of interest at a class/location level.

The output of the first stage is a simulation of the performance we would have seen by week without these factors influencing the business. The key outcome is a subtraction of the simulated performance from actual performance—called the residual. The residual is a value that is anchored at zero and fluctuates negative or positive aligned to the more nuanced strategic actions and the unexplained noise that exists in any retail business.

The second stage uses the residual from stage one to deliver an attribution that quantifies the relationship between disruptions (merchant specific and localized specific) factors and store performance. One example of an exogenous factor impacting stores is weather. Temperature and precipitation volume rise and fall compared to localized norms and both momentary and sustained abnormal weather can impact the performance of the business. Some business activities also fluctuate resulting in both immediate brief impacts (transition hours and the disruption as product is reset) or lingering impacts (pricing changes or divergence from core competitors). Identifying quantifiable metrics that represent the strategic priorities and exogenous variables impacting each store allows us to regress them against the residual at both a chain and a store level over time.

The outcome of stage two is a weekly attribution is then factored for left over trends component. Business leaders can then use the outcome to view the forecasts as well as impacts of every included strategic factor. The results can be aggregated across class/category—stores and/or time to reflect changes in the impact over time and by segment. Weekly infographic is circulated to business leaders. Sample infographic is pasted below.

Forecasting

Factors identified as affecting sales can be utilized to predict future sales performance. The sales effects of drivers in the past can be expected to cause similar deviations from normal sales performance when those same drivers are expected to happen again. For example, changes in normal sales patterns caused by a blizzard can be recorded and then utilized when a blizzard is expected to affect a group of retail stores. In this way, drivers can be utilized to inform updates to demand forecasts for future sales performance at one or more store locations. In some embodiments, these anticipated effects are limited to particular store locations or particular item categories.

FIG. 1 illustrates a schematic diagram of an example retail enterprise system 100 useable to manage a plurality of retail stores within a retail chain. The retail enterprise system 100 includes a plurality of geographically disparate retail stores 102. The retail stores 102 offer a plurality of items in different categories for sale to customers. These stores 102 are in communication with a retail enterprise computing system 104. In some embodiments, the retail enterprise computing system 104 is also in communication with an online system for receiving and fulfilling customer orders for retail items.

The retail enterprise computing system 104 includes a strategic planning platform 106, a supply chain manager 108, a pricing manager 109, a labor manager 110, a sales data store 112, an inventory data store 114, a plurality of different, heterogeneous driver data sources 116, and a retail analysis platform 120. In some embodiments, the retail enterprise computing system 104 also includes a development and testing environment 122, a planner dashboard 124 within the strategic planning platform 106, and a demand forecaster 128. The retail enterprise computing system 104 also includes one or more administrator user computing device 130 in communication with the strategic planning platform 106.

The strategic planning platform 106 operates to design and implement strategic plans for the management of the retail enterprise. Strategic plans apply to everything from item ordering from vendors, inventory positioning, and item placement within store to pricing of items, implementation of promotions and sales, to planning for labor at each of the retail store locations. In some embodiments, strategic plans involve the addition or removal of retail store locations, remodeling of existing store locations, and updating store policies for all or some of the plurality of retail stores 102. The strategic planning platform 106 operates to implement strategic plans by communicating with other components of the retail enterprise computing system 104. Such components can include a supply chain manager 108, a pricing manager 109, a labor manager 110.

The supply chain manager 108 operates to manage the intake, positioning, and output of inventory within a retail supply chain. Items are tracked within the supply chain from vendor to customer. Inventory levels at each of a plurality of nodes within the supply chain are tracked and managed to ensure that inventory is positioned in locations where it can best meet the demands of customers. The supply chain manager 108 communicates purchase orders to vendors and transfer orders to nodes within the supply chain to move inventory to where it is needed. The supply chain manager 108 can shift the positioning of items within the supply chain in response to changes in demand forecasts that are communicated to the supply chain manager 108 from the strategic planning platform 106.

The pricing manager 109 operates to manage pricing of items that are sold within the retail enterprise. Pricing includes regular pricing, promotional pricing, and sale pricing. The pricing manager 109 utilizes instructions from the strategic planning platform 106 to set different price points for items that are sold at one or more stores within the supply chain. Changes in sales trends and updates to demand forecasts can prompt changes in pricing.

The labor manager 110 operates to manage and implement changes to personnel levels, scheduling, and placement at retails stores within the retail enterprise. Sales trends and shifts in forecasted demand can prompt changes to overall labor needs or needs within a geographic area or even within a single retail store. The strategic planning platform 106 can communicate such needs to the labor manager 110 to implement changes in personnel that are scheduled based on time and location.

The strategic planning platform 106 includes a planner dashboard 124 which operates to organize data from within the strategic planning platform 106 for display on administrator user computing device 130. The planning dashboard 124 provides visualizations of sales analysis data and options for adjusting strategic plans. The planning dashboard 124 can receive input from the administrator user computing device 130 and communicate commands to the strategic planning platform 106. In some embodiments, the planner dashboard 124 can communicate inputs from the administrator user computing device 130 to the development and testing environment 122 to test new metrics for future sales analysis. The planner dashboard 124 can similarly communicate adjustments to the demand forecaster 128 in order to more accurately predict sales performance for future periods of time for one or more stores and one or more item categories.

The sales data store 112 stores both historical sales data and recent sales data. Historical sales data refers to sales data that is recorded for at least one year from all of the stores within the retail enterprise. This historical sales data is utilized to determine average baseline sales for a given time period within the year, such as a week. In some embodiments, at least 3 years of historical sales data are needed to form a baseline for a given store location. Recent sales data refers to sales data received for each of the stores in the retail enterprise for a given period of time in recent history such as the previous week. This data is used to determine trends in sales performance for that recent period of time.

The inventory data store 114 includes information about items available for sale at the retail stores 102. Information can include descriptions of items, characteristics of items, prices of items, item categories, current locations of items, and current quantity of items. The inventory data store 114 can be accessed by multiple components of the retail enterprise computing system including the retail analysis platform 120.

The data sources 116 include driver data from various platforms. The driver data can be sourced from internal data sources as well as external data sources. More detailed descriptions of examples of driver data are described in FIG. 3.

The retail analysis platform 120 operates to analyze the driver data and sales data to identify trends in sales performance for the retail enterprise. The trends can be broken down by individual retail store and item category. The retail analysis platform 120 is described in further detail with respect to FIG. 2.

The development and testing environment 122 operates to test new and modified models and data sources for use in analyzing sales trends. This environment 122 does tests runs before these models and data sources are implemented by the retail analysis platform 120. The development and testing environment 122 receives feedback from the planner dashboard 124 about new modifications to the driver data and models to utilize to analyze sales performance.

The demand forecaster 128 operates to produce forecasts for anticipated demand for items sold by the retail enterprise.

Figure 2:
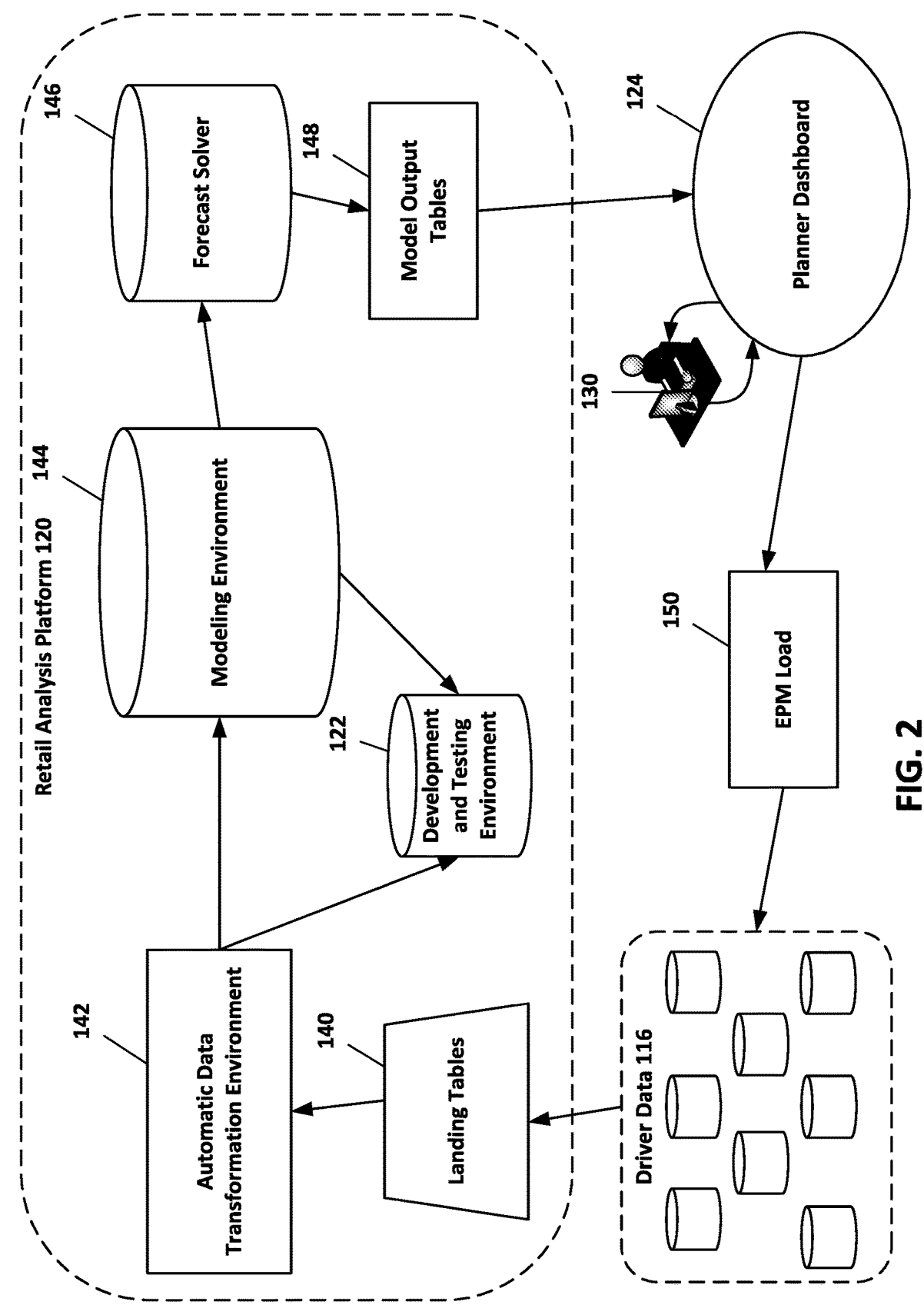
FIG. 2 illustrates a more detailed diagram of the retail analysis platform of FIG. 1.

FIG. 2 illustrates a more detailed diagram of the retail analysis platform 120 of FIG. 1. The driver data 116 is described in greater detail with respect to FIG. 3.

The landing tables 140 receive data from data stream jobs originating from the driver data sources 116. Data stream actions have been set up to automate the process of data flow from the different data sources to land in the landing tables as Hive tables. In some embodiments, up to 20 different data stream actions can be fetched at a weekly level.

The automatic data transformation environment 142 operates to extract, clean, transform, join, and aggregate data from all of the required tables. The Hive tables from the landing tables 140 are processed in a pyspark environment. Data is organized by store location, class of good, and week. Examples of processing include sanity checks, missing value, and outlier treatment. The focus is on data quality and integrity. Additional details of the automatic data transformation environment 142 are described in FIG. 4.

In some embodiments, the retail analysis platform 120 includes a development and testing environment 122. Development and testing would take place in this environment. New metrics can also be loaded into the environment for testing algorithms.

The modeling environment 144 is where models are built at the level of class or category, individual retail store, and week. Modeling includes determining a baseline for the class and location based on a median for 4 years sum. Modeling is also done for seasonality which examines seasonal influences on sales. The modeling also includes disruptions such as like weather storms or those that are controlled by the retail like remodeling. Finally trends are modeled and attributed it to likely contributors. Models weigh different drivers in different ways for each combination of item class and store location.

The forecast solver 146 operates to generate forecasted values based on the attribution modeling coefficients. Predictor values are also helping in forecast estimation. The forecast solver 146 output forecast data to hive tables in the model output tables 148.

The planner dashboard 124 operates to receive forecasts and presents them on planner dashboard. Information on the planner dashboard is consumed by users through the computing devices 130. Interactive research and feedback produces loops to improve the functionality of the model.

The EPM load 150 facilitates the template loads to tools used by planners by eliminating some intermediary steps.

Figure 3:
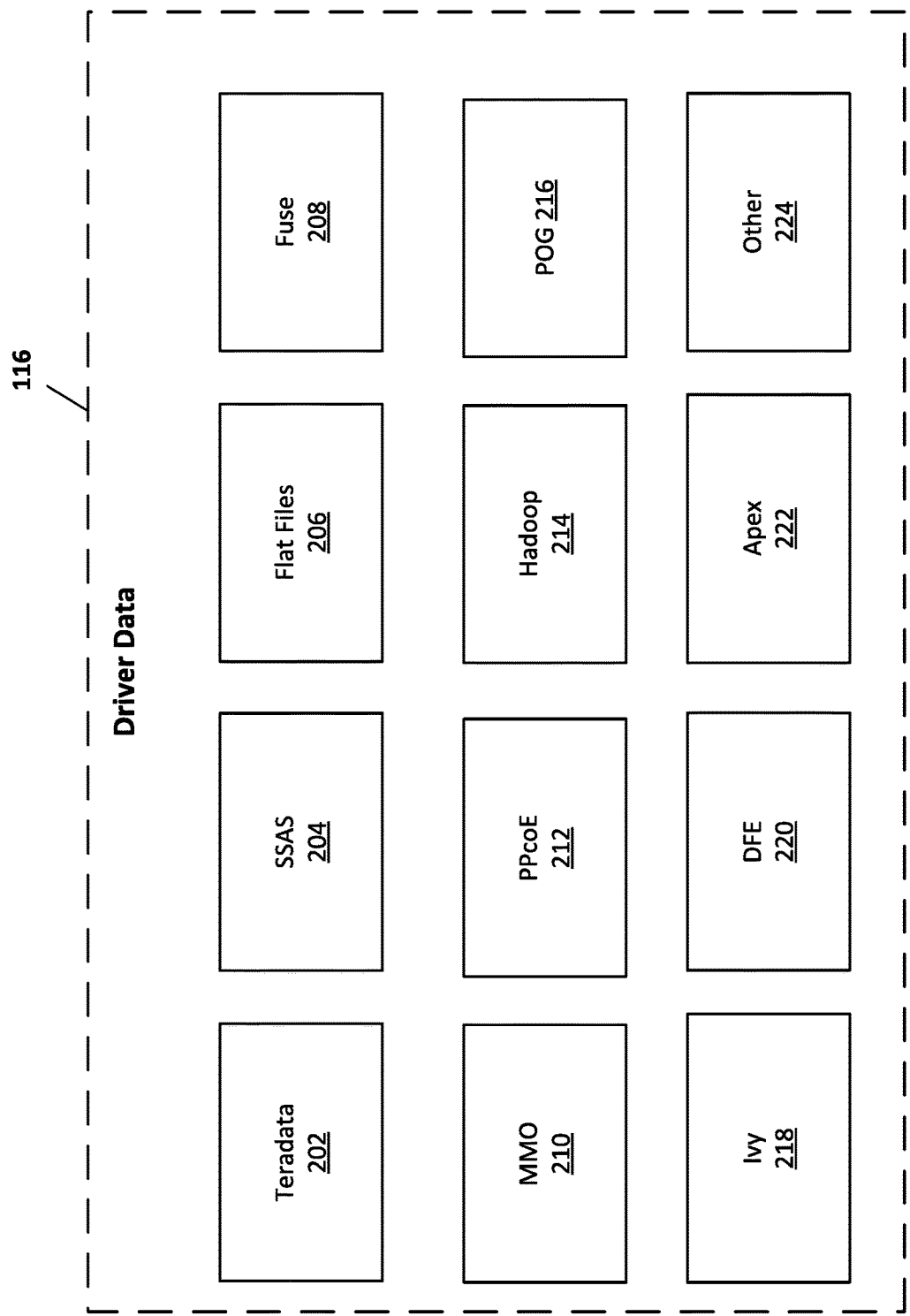
FIG. 3 illustrates a detailed schematic diagram of the data sources of FIGS. 1-2.

FIG. 3 illustrates a detailed schematic diagram of the data sources 116 of FIGS. 1-2. The data sources 116 can be external to the retailer or be internal to the retailer system. The data sources 116 provide information that is processed by the models to determine their effect on sales performance. The data sources 116 can store different types of data in different formats. This data needs to be converted to a consistent format in order to be analyzed. The example of FIG. 3 illustrates a plurality of different types of data that can be ingested by the system.

The Teradata 202 is output from a third party business analytics software service. Various teams within the retailer enterprise load data into labs for different purposes. Such purposes can include remodeling, transition hours, etc.

The SSAS 204 cubes are leveraged to store sales, digital sales, and promotions data. Store sales refer to sales made to customers at a physical retail store. Digital sales refers to sales made to customers through an online portal such a retailer website. Promotions data refers to information regarding the terms of promotions, the items involved, and the resultant sales of those items. The SSAS 204 cube serves as a single source of truth and is to generate KPM reports. SQL (structured query language) Server Analysis Services (SSAS) can be used to create cubes using data from data storage for deeper and faster data analysis. Cubes are multi-dimensional data sources storing information about sales broken down into dimensions such as items, times, and locations.

The Flat Files 206 store data such as demographics, crossjoining, and competition information. This data is stored in simple databases that may only contain a few fields per entry in a text sheet.

DFE 220 data is sourced from a demand forecasting engine. An example of a demand forecasting engine (DFE) is described in U.S. patent application Ser. No. 16/172,575 filed Oct. 26, 2018 (which is hereby incorporated by reference). This provides information about expected demand for particular items in particular stores for a given time period.

Other data sources include Apex 222 data, Fuse 208 data, media and marketing optimization data (MMO) 210, competitive pricing data (PPcoE) 212, Hadoop 214 data, planogram (POG) data 216, and Ivy data 218. Other data 224 may be utilized by the system as well.

Figure 4:
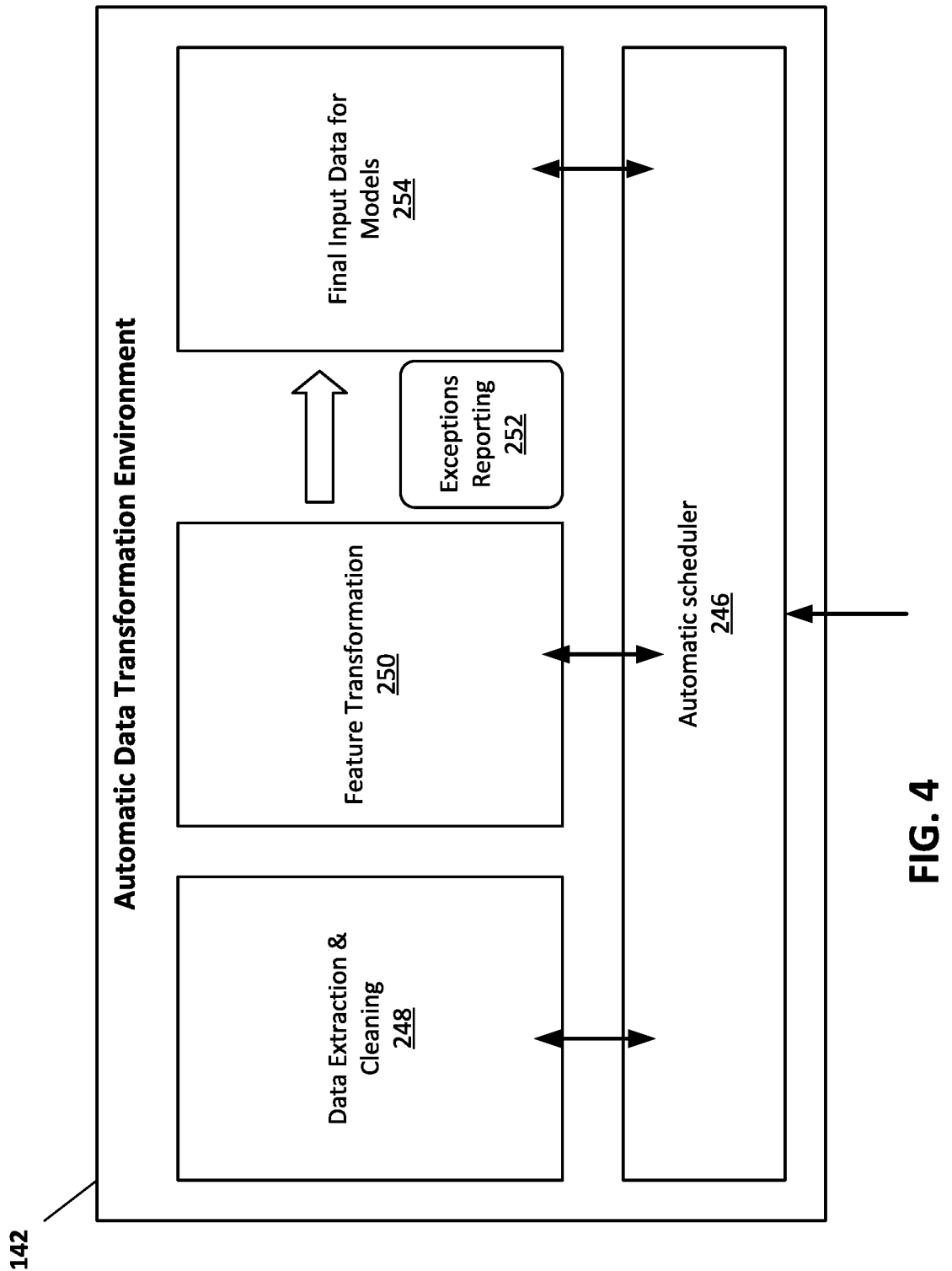
FIG. 4 illustrates a detailed schematic diagram of the automatic data transformation environment of FIG. 1.

FIG. 4 illustrates a detailed schematic diagram of the automatic data transformation environment 142 of FIG. 2. The automatic data transformation environment 142 operates to extract, clean, transform, join, and aggregate all data tables together. This produces final input data that is formatted and ready to use by the modeling environment 144.

An automatic scheduler 246 operates to ingest driver data on a regularly scheduled basis. Data stream jobs can be scheduled on a regular basis or can be triggered in response to certain events. In some embodiments, the automatic scheduler 246 causes data stream actions to occur to pull driver data on a weekly basis. In some embodiments, this process is performed by a pyspark environment using hive tables.

The data extraction and cleaning module 248 receives driver data and organizes the data for use by the models. In some embodiments, the driver data is organized by retail location, item class, and week. Sanity checks are performed. Missing values are supplied from averages. Outliers are removed to "smooth" the data.

The feature transformation application 250 operates to correlate driver data to historical sales data across all of the retail locations within the retail enterprise. The result is processed data or final input data that is usable by the models 254. The final input data is formatted for use by the modeling environment 144.

The exceptions reporting module 252 operates to provide an alert when there is a major deviation between actual sales performance and the forecasted demand. This indicates that there should be a modification to the process of analyzing sales data—such as including an additional driver.

Figure 5:
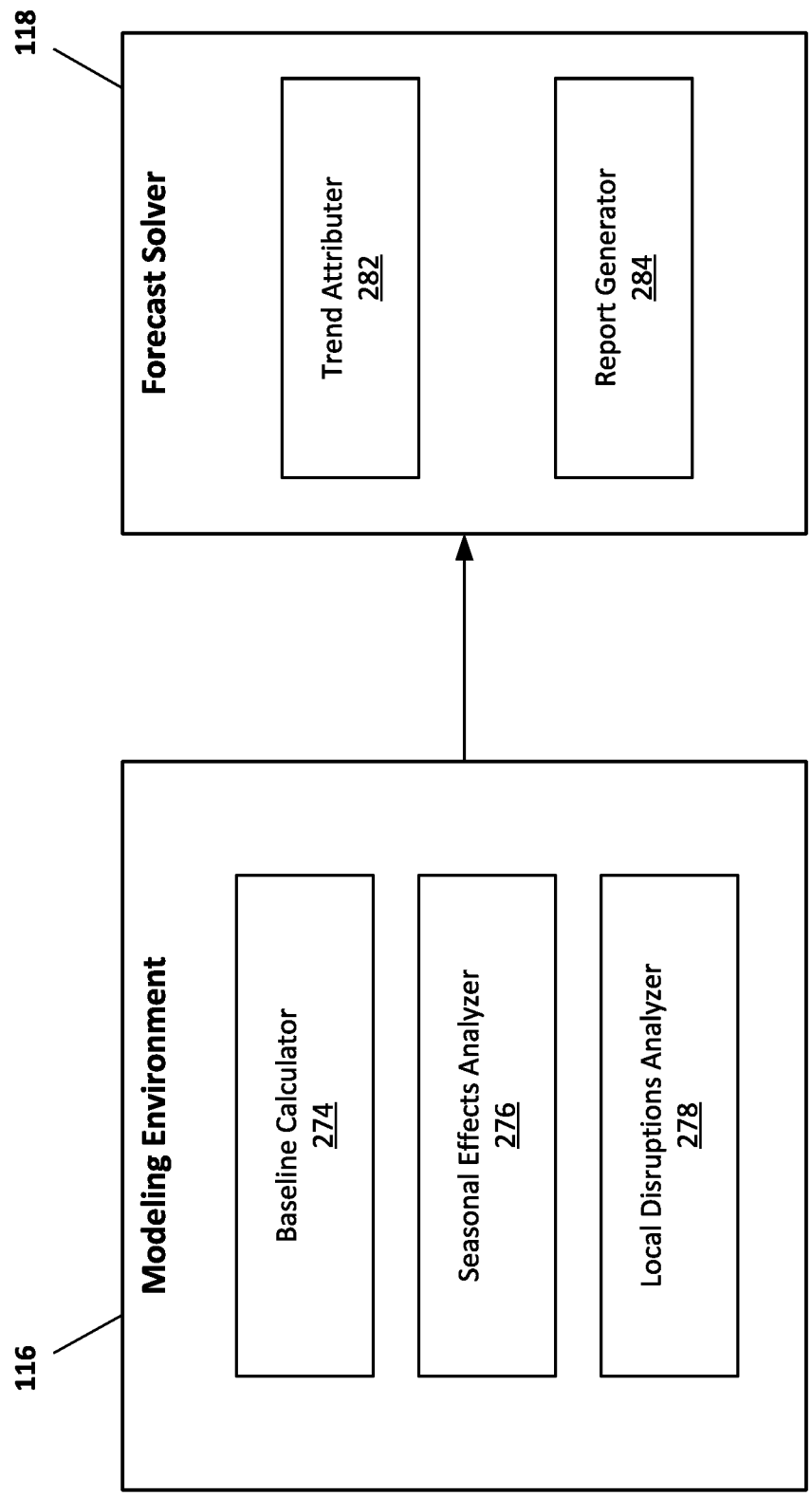
FIG. 5 illustrates a detailed schematic diagram of the modeling environment and forecast solver of FIG. 2.

FIG. 5 illustrates a detailed schematic diagram of the modeling environment 116 and forecast solver 118 of FIG. 2. The modeling environment 116 includes a baseline calculator 274, a seasonal effects analyzer 276, and a local disruptions analyzer 278. The forecast solver 118 includes a trend attributer 282 and a report generator 284.

The baseline calculator 274 operates to determine baseline sales for a given week, class of items, and store location. The baseline is determined based on historical sales data for a given week in previous years. In some embodiments, at least 4 years' worth of historical sales data is required to establish a median baseline of sales performance. This baseline is calculated to established the "normal" sales for a given store and item classification for the given week. The baseline sales are removed from the sales figures for a recent time period (week) to leave behind any other fluctuations in sales performance.

The seasonal effects analyzer 276 operates to determine the seasonal fluctuations in sales for a given class of items at a particular retail store for a particular week. These seasonal fluctuations can be calculated using driver data related to seasonal events, such as a vacations, holidays, and school schedules. These seasonal effects are predicable, regularly-occurring events that repeat year after year. The seasonal effects on sales are removed from recent sales figures to leave behind other deviations from sales performance.

The local disruptions analyzer 278 operates to determine the localized disruptions to sales for a given class of items at a particular retail store for a particular week. These localized disruptions can be calculated using driver data related to localized events that are either within the control of the retailer or outside of the control of the retailer. Some localized disruptions can be anticipated because they are scheduled events. Others can be anticipated because they are caused by initiatives or activities within the control of the retailer. Other disruptions are not predictable, but can be attributed to driver data such as weather events or political demonstrations.

The trend attributer 282 finds trends in sales data after the effects of seasonality and local disruptions are removed. The trend attributer 282 accesses a demand forecast for a given week and utilizes that as a point of comparison for sales data for that same week. This difference results in a trend and the deviations from the expected sales numbers are attributed to various drivers. In some instances, fluctuations in sales numbers can be attributed to more than one driver.

The report generator 284 operates to produce reports for each week. These reports identify the key drivers that are attributable to the differences in sales from what was predicted. In some embodiments, the report generator 284 also generates an updated demand forecast for an upcoming week based on various drivers including upcoming seasonal effects and anticipated disruptions.

Figure 6:
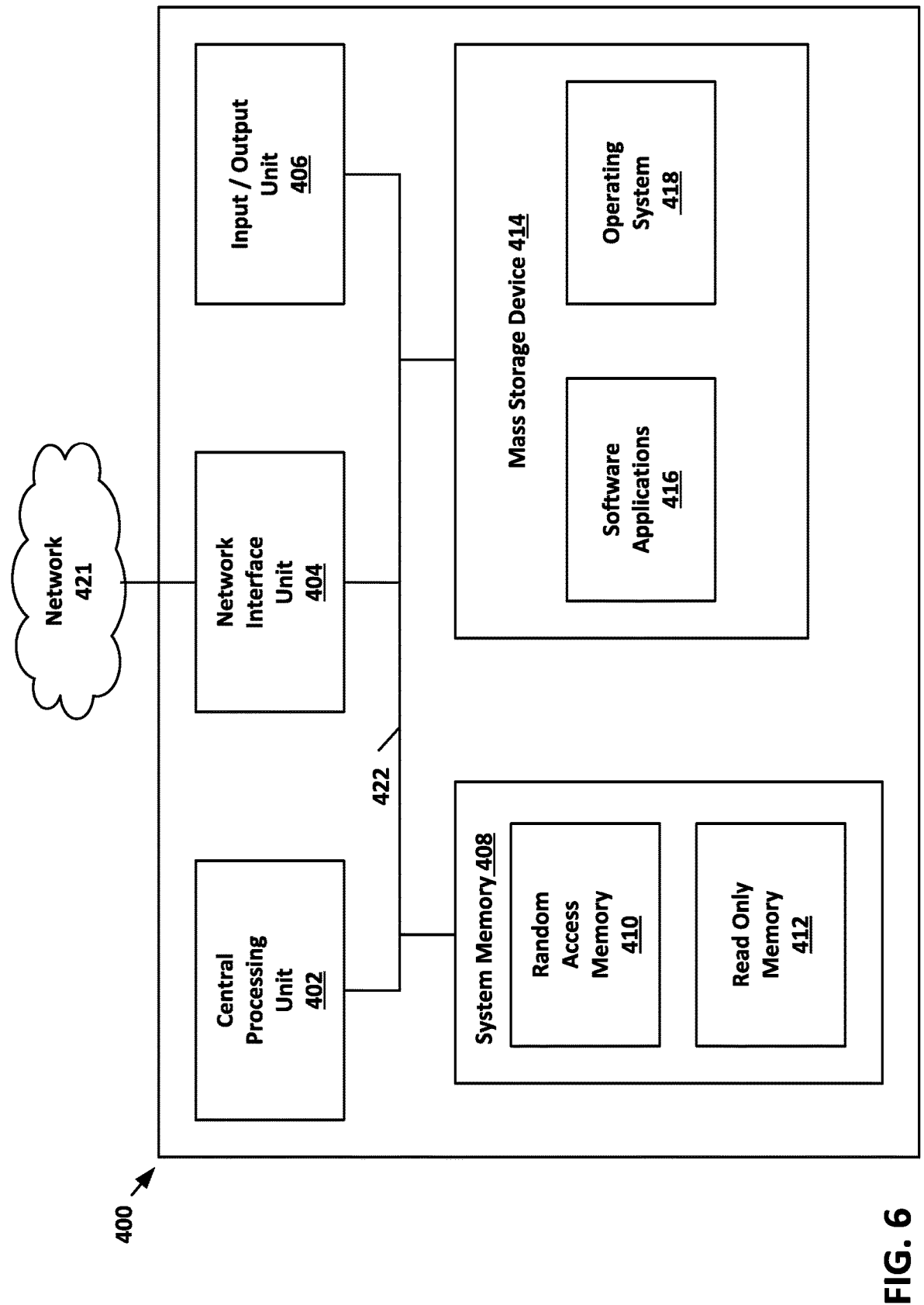
FIG. 6 displays a schematic diagram of an example computing device usable in the system of FIG. 1.

FIG. 6 displays a schematic diagram of an example computing device 400 usable in the system of FIG. 1. The example computing device 400 is representative of the administrator user computing device 130 of FIG. 1.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 420 to receive and analyze carrier information to optimize delivery modes.

Figure 7:
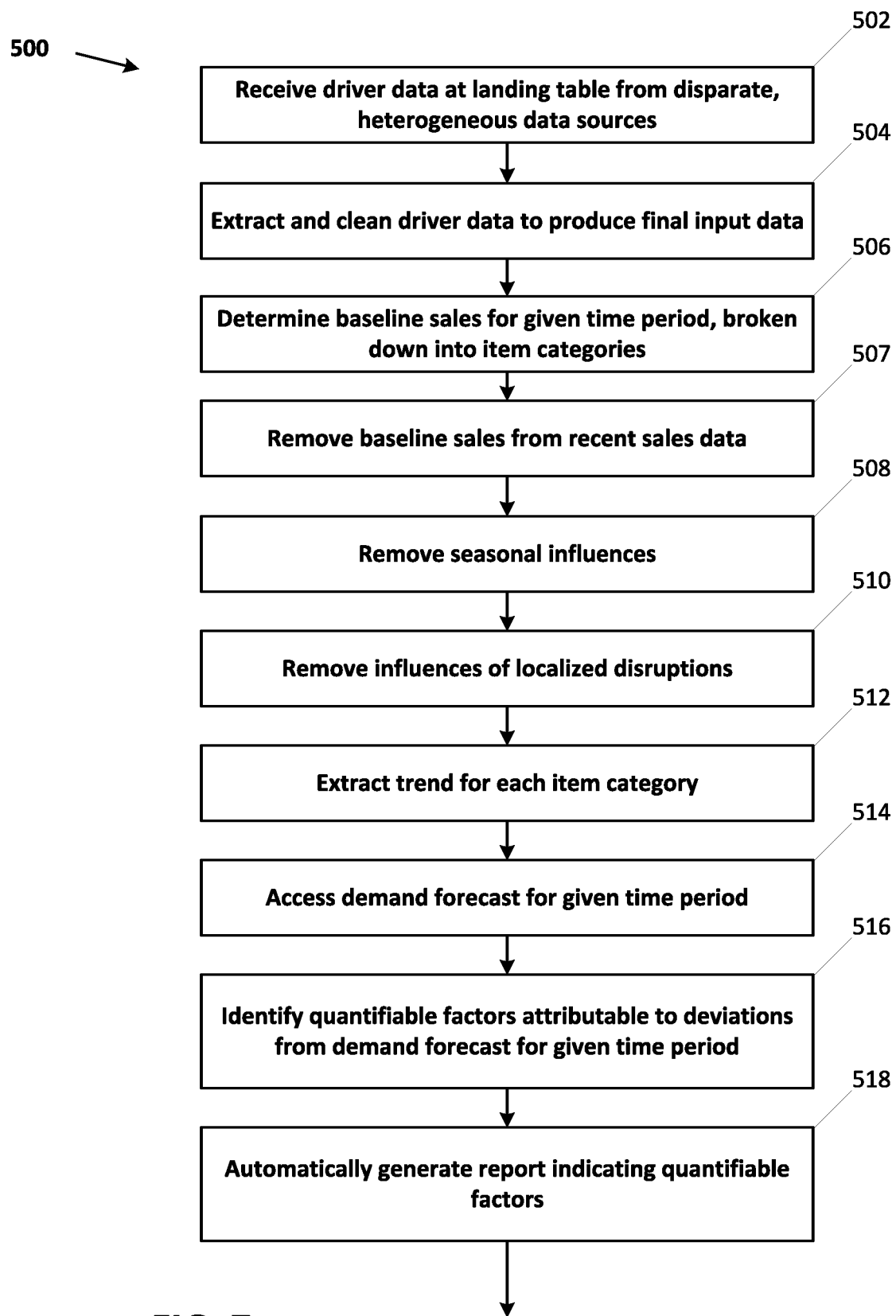
FIG. 7 illustrates an example method of analyzing sales performance in a retail enterprise.

FIG. 7 illustrates an example method 500 of analyzing sales performance in a retail enterprise. The method 500 can be performed by the systems described in FIGS. 1-6. The method is performed by a computing system within a retail enterprise that includes a plurality of retail store selling items in a plurality of item categories.

At operation 502, driver data is received at landing table within a computing system. The driver data is received from a plurality of disparate, heterogeneous data sources and indicates internal and external effects on sales at one or more retail store from among a plurality of retail stores in a retail enterprise. The driver data can come in multiple different formats. The driver data may have an original purpose that is unrelated to analyzing sales performance. For example, temperature data could come from a source where its main purpose is to provide a weather forecast.

At a predetermined time, a sales analysis process is automatically initiated within a retail analysis platform, such as the retail analysis platform 120 of FIG. 2. In some embodiments, this sales analysis process is scheduled to automatically initiate once a week.

At operation 504, the driver data is extracted and cleaned within an automatic data transformation environment such as the automatic data transformation environment 142 of FIG. 2. Driver data is aggregated, organized, and converted into final input data that is formatted for use in the next steps of the method.

At operation 506, baseline sales for a given time period are determined across the retail enterprise. The baseline sales are calculated by determining median sales based on at least two years of historical sales data. In some embodiments at least 4 years of historical sales data are utilized to determine the median sales. The baseline sales are broken down into each of a plurality of item categories.

At operation 507, the baseline sales are removed from the recent sales data. This is performed for each category of items at each store location. The remaining sales data is a first set of adjusted sales data.

At operation 508, the first set of adjusted sales data is adjusted again to remove seasonal influences. The final input data is utilized to perform this adjustment. Drivers related to seasonal changes in sales are weighed and utilizes to adjust the sales figures. This results in a second set of adjusted sales data.

At operation 510, the second set of adjusted sales data is adjusted by utilizing the final input data to remove influences of localized disruptions to produce a third set of adjusted sales data. The drivers related to localized disruptions can be specific to particular types of stores or geographic areas. In some embodiments, adjustments for localized disruptions are removed one at a time.

At operation 512, a trend for each of the item categories is extracted from the final input data after the seasonal influences and localized disruptions have been removed.

At operation 514, a demand forecast for the given time period is accessed. In some embodiments, the demand forecast is accessed from a demand forecaster 128.

At operation 516, the final input data and the third set of adjusted sales data are automatically analyzed to identify quantifiable factors attributable to deviations from the demand forecast for the given time period. The quantifiable factors are associated with particular types of driver data. For example, a quantifiable factor could be temperature, where the measure is deviation from average temperatures for a given time period at a given location.

At operation 518, a report is automatically generated indicating the quantifiable factors applicable within the given time period. The report can provide information about trends identified in the analysis as well as an indication of how the quantifiable factors match with deviations from the demand forecast for a given set of stores and item categories.

Figure 8:
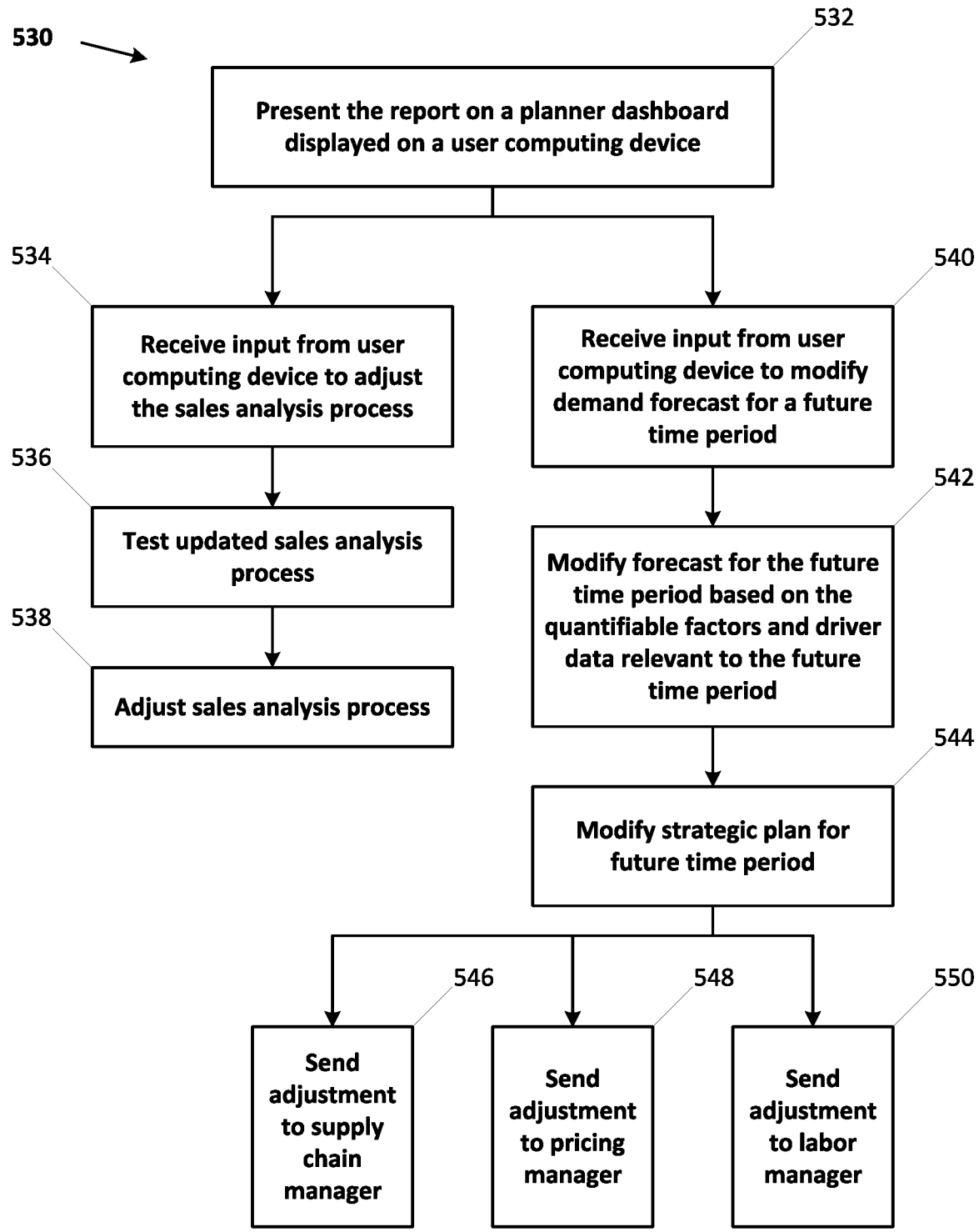
FIG. 8 illustrates an example method of utilizing information from the report produced in FIG. 7.

FIG. 8 illustrates an example method 530 of utilizing information from the report produced in FIG. 7. This method 530 is primary performed by the strategic planning platform 106 of FIG. 1.

At operation 532, the report is presented on a planner dashboard displayed on a user computing device. The planner dashboard can be accessed by administrator computing devices 130. Visualizations of sales data and the report can be viewed and manipulated using the planner dashboard. Further actions can be taken after viewing the report.

Operation 534 describes one possible action where a user can provide input to a computing device indicating that a sales analysis process should be adjusted. The adjustment could be the addition or removal of a type of driver data. The adjustment could be weighting driver data types differently for a given model.

At operation 536, the updated sales analysis process is tested. This can be performed in a development and testing environment 122. Modifications to models can be tested as well as different combinations of driver data.

At operation 538, the sales analysis process is modified at the retail analysis platform 120. The sales analysis process will then be implemented the next time the analysis is run with new sales data.

Operation 540 describes another action that could be taken after viewing a report. Input from a user computing device is received which indicates that a demand forecast for a future time period should be modified. In some embodiments, the adjustment to the demand forecast could be initiated automatically in response to the report. In other embodiments, user input is required to adjust the future demand forecasts.

At operation 542, the demand forecast is modified based on the quantifiable factors and driver data relevant to the future time period. In the example of temperature data, a demand forecast could be modified based on expected temperatures for that time period. The demand forecast could be further modified based on trends identified in the report.

At operation 544, the strategic plan for one or more retail stores within the enterprise could be modified in response to the updated demand forecast. Various actions could be taken to respond to updates in expected demand for items.

At operation 546, an adjustment could be sent to a supply chain manager 108. This adjustment could modify inventory positions, inventory amounts, or which items are stocked by the retailer.

At operation 548, an adjustment could be sent to a pricing manger 109. The adjustment could modify how items are priced or which items will be under promotion for a given time period.

At operation 550, an adjustment could be sent to a labor manager 110. This adjustment could modify how many employees are on staff at a given store location, how many employees are scheduled to work a given day, or where within a store employees are utilized.

Figure 9:
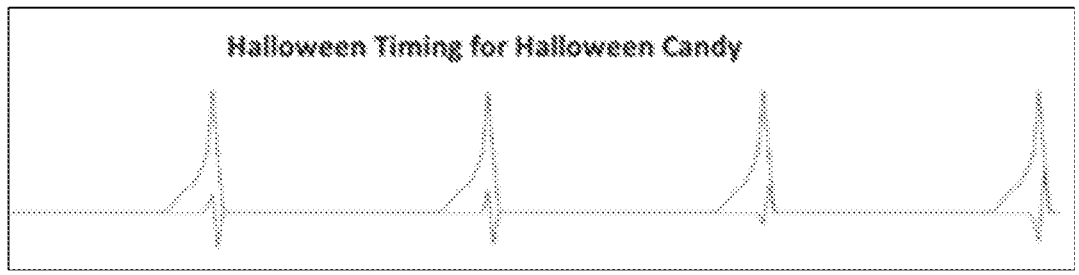
FIG. 9 is a graph reflecting an example of seasonal influence on sales.

FIG. 9 shows example visualizations of seasonal effects on sales performance. The graph 600 at the top shows an example of a holiday that exerts an effect across the entire retail chain for Halloween candy sales. Some seasonal effects are based on local geography in places where populations shift with the seasons, and therefore sales also shift with the season.

Figure 10:
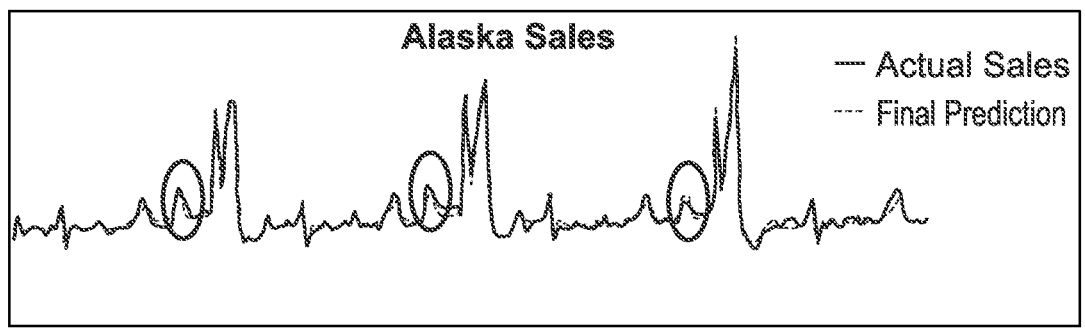
FIG. 10 is a graph reflecting another example of seasonal influence on sales.

In the example of FIG. 10, the graph 602 shows the effects on sales of the seasons in Alaska. Local seasonal changes exclusive to Alaska are causing spikes in sales. For both graphs, a clear cyclical pattern in sales can be seen.

Figure 11:
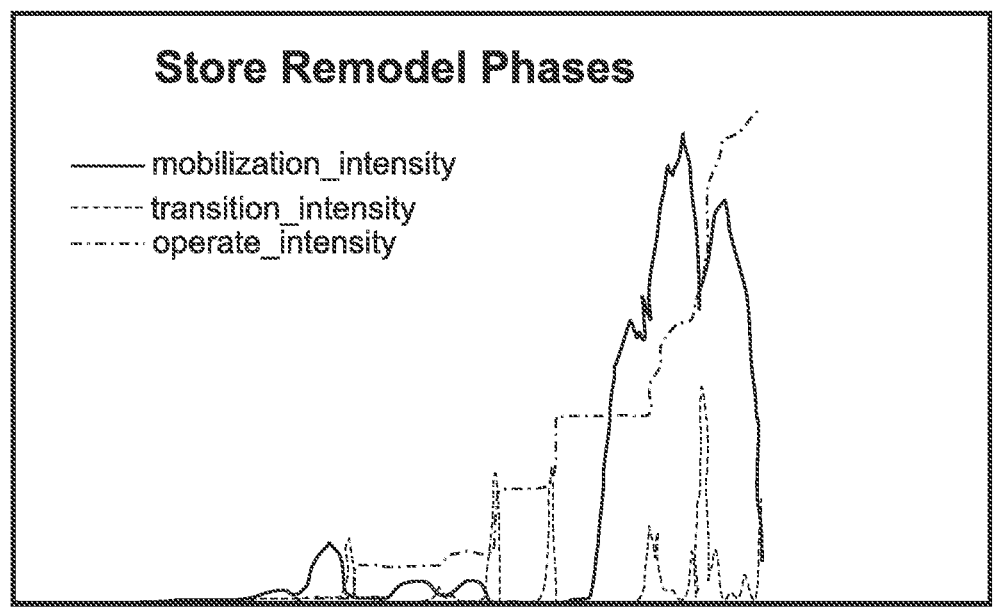
FIG. 11 is a graph reflecting an example of a localized disruption's effect on sales.

FIG. 11 shows example visualizations of localized disruptions on sales performance. The graph 604 shows an example of a disruption that is within the control of the retail enterprise—a store remodel. The graph 604 shows the effects on sales of various phases of the remodel process for a given retail store.

Figure 12:
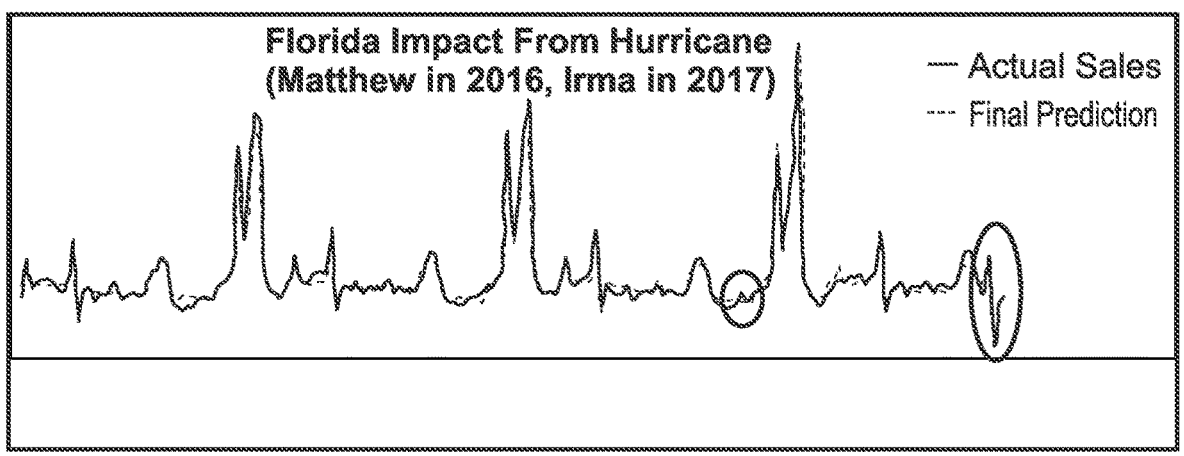
FIG. 12 is a graph reflecting another example of a localized disruption's effect on sales.

FIG. 12 illustrates another visualization of a localized disruption. The graph 606 shows an example of a disruption is not within the control of the retail enterprise—hurricanes. The circled portions of the graph 606 indicate major hurricanes within the United States which negatively affected sales performance.

Figure 13:
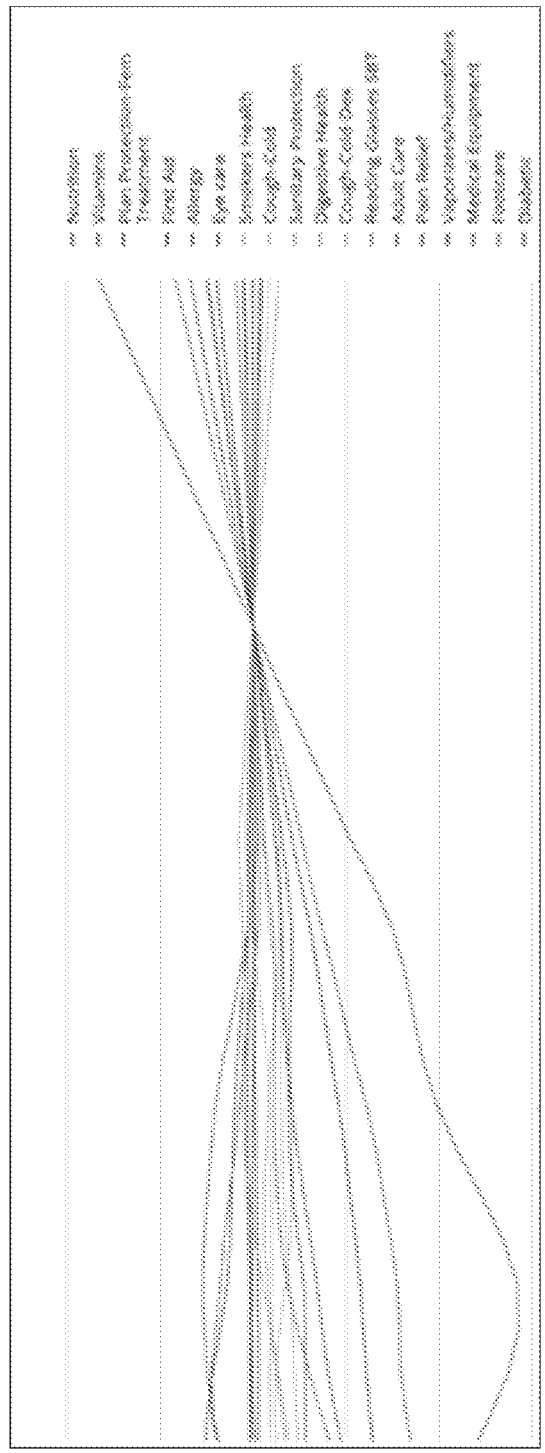
FIG. 13 illustrates an example graph showing the overall trends in sales for items sold by a retail enterprise.

FIG. 13 illustrates a graph 608 showing the overall trends in sales for over-the-counter (OTC) medications. This is the result of removing the baseline sales along with the sales effects of seasonality and localized disruptions. This particular graph 608 includes data for 4 years across all stores, for a variety of item classes that fit within the OTC group. One clear trend shows that nutrition products have increased in popularity over time.

FIG. 14 illustrates an example report 610 for a given week. This report identifies key performance and marginal effects for a week in October. The report 610 includes a sales summary 614 which shows sales numbers generally, as well as indications of how differences in sales can be attributed to various factors. Highlights of those attributions are summarized in the attribution highlights 616. The report also indicates some factors that will be important to sales performance for the upcoming week, which are summarized in the forecast drivers 618 section. Other examples of reports are possible.

A number of benefits and efficiencies are achieved by the methods and systems described herein. The system automates the ingestion of data streams on a regular schedule to pull driver data from heterogeneous sources. These sources can be external and internal to the retail enterprise and exist in various formats. To be able to utilize this data, it needs to be organized and cleaned to produce data in a single format that is usable by the models. This process occurs automatically. This automated process replaces existing methods which required individual actions to be taken by a user to access each data source and import that data into an analysis system. The user would have to determine which data sources to consider for each item category and/or store location. The current methods and systems automate this process and determine which driver data to consider and how much each driver data type should be weighed in analyzing sales performance for a given time period.

The systems and methods further provide benefits in how trends in sales data are identified. The top-down approach to sorting through sales data is unique compared to existing methods which look at sales performance of individual items and then aggregate from there to produce trend reports. The top-down approach starts with overall sales for a retail chain and removes baseline sales. The remaining sales deviations are then attributed to unique combinations of sales drivers that are applicable to each store location and category of items. Individual models are developed for each combination of item category and store location. This is honed with feedback loops and a development environment to test modifications to the analysis. New drivers can be added to the analysis and different weightings of drivers can be tested to determine which combination best reflects the conditions for that particular store and item category. This iterative process is automated, thus allowing for continual improvements in predicting sales performance without constant intervention from a user.

The methods and systems described herein further provide the advantage of producing reports that can be manipulated to view larger trends within a retail enterprise. Item categories can be grouped together to identify larger trends for different types of items. Similar stores can be grouped together to identify greater trends that are specific to a geographic area or type of store. These reports can be manipulated within a planner dashboard to produce visualizations of the data that inform various strategic decisions for managing the retail enterprise.

All of these automated tools allow for more efficient processing of sales and driver data in order to identify trends. Fewer inputs need to be processed from user computing devices. Fewer commands are issued between components of the computing system.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of identifying sales trends in a retail enterprise, the retail enterprise comprising a plurality of retail stores selling items in a plurality of item categories, the method comprising:
automatically ingesting data having different data formats from a plurality of disparate, heterogeneous data sources to a landing table within a computing system using an automatic scheduler operating on the computing system, the data including multiple types of driver data that are indicative of internal and external effects on sales at one or more retail stores from among the plurality of retail stores, and sales data comprising historical sales data and recent sales data for a given time period in the past;
automatically extracting and cleaning the data from the landing table within an automatic data transformation environment, the extracting and cleaning comprising converting the different data formats of the data to a consistent format and organizing the data by retail store, item category, and the given time period;
automatically initiating a sales analysis process within a retail analysis platform for each combination of retail store and item category identified within the landing table, wherein the sales analysis process for a retail store and an item category includes:
automatically generating, within a modeling environment, a model for the retail store and the item category by selecting from and weighting the multiple types of driver data for the retail store and the item category;
determining with a baseline calculator operating within the modeling environment, from the historical sales data, and across the retail enterprise, baseline sales in the item category for the given time period at the retail store;
removing the baseline sales from the recent sales data to produce a first set of adjusted sales data;
utilizing the model to remove seasonal influences from the first set of adjusted sales data, based on the driver data, to produce a second set of adjusted sales data, wherein the seasonal influences are predictable based on the historical sales data;
utilizing the model to remove influences of localized disruptions from the second set of adjusted sales data, based on the driver data, to produce a third set of adjusted sales data; and
extracting, using a forecast solver operating on the retail analysis platform, a trend for the retail store and the item category over the given time period, based on the third set of adjusted sales data;
accessing a demand forecast for the given time period from a demand forecaster;
automatically analyzing the third set of adjusted sales data and the demand forecast to identify quantifiable factors associated with one or more of the multiple types of driver data that are attributable to deviations of the third set of adjusted sales data from the demand forecast for the given time period; and
automatically generating a report indicating the quantifiable factors applicable within the given time period for the retail store and the item category;
for at least one combination of retail store and item category identified within the landing table, receiving feedback indicating to adjust the respective model generated for the at least one combination of the retail store and the item category;
based on the received feedback, adjusting, within the modeling environment, the respective model by at least one of including different driver data types in the respective model and providing different weights for the driver data types; and
reinitiating the sales analysis process for the at least one combination of the retail store and the item category using the adjusted model.

2. The method of claim 1, further comprising;
modifying a demand forecast for a future time period based on the quantifiable factors and driver data relevant to the future time period, to produce an updated demand forecast;
communicating the updated demand forecast to a strategic planning platform; and
designing, at the strategic planning platform, a strategic plan for the retail enterprise.

3. The method of claim 2, further comprising implementing the strategic plan by adjusting at least one of inventory level and personnel level at one or more retail stores based at least in part on the updated demand forecast.

4. The method of claim 1, wherein the driver data comprises one or more of internal labor planning data, pricing data, inventory data, planogram data, promotions data, and store remodeling plans.

5. The method of claim 1, wherein the driver data is received from a third party data source.

6. The method of claim 1, wherein cleaning the data further comprises processing the data to remove outliers, perform sanity checks, and supply missing values.

7. The method of claim 1, wherein the data is received from data stream actions that are automated to be performed on a weekly basis.

8. The method of claim 1, wherein the seasonal influences comprise at least one of adjustments due to local events, shifts between store sales and digital sales, and seasonal influences indexed to promotional and clearance intensity rates.

9. The method of claim 1, wherein the localized disruptions are caused by external factors comprising at least one of severe weather, unusual temperatures, unusual precipitation, and disruptive local events.

10. The method of claim 1, wherein the localized disruptions are caused by internal factors comprising at least one of remodeling disruptions, spaces changes in a retail store, assortment changes in a retail store, and planogram placement decisions.

11. A system for analyzing trends in sales data for a retail enterprise comprising a plurality of retail locations, the system comprising:
a retail analysis platform comprising a processor communicatively connected to a memory comprising:
a data extraction and analysis automation platform comprising:
a scheduler configured to automatically ingest data having different data formats from a plurality of disparate, heterogeneous data sources to a landing table, the data including multiple types of driver data that are indicative of internal and external effects on sales at one or more retail locations from among the plurality of retail locations, and sales data comprising historical sales data and recent sales data for a given time period in the past;
a data extraction and cleaning application called by the scheduler to apply one or more data organization and cleaning processes to the data ingested to the landing table, the one or more data organization and cleaning processes comprising converting the different data formats of the data to a consistent format and organizing the data by retail location, item category, and the given time period;
a modeling environment configured to access the data and initiate a sales analysis process for a retail store and an item category identified within the landing table, the modeling environment including:
a model engine configured to generate a unique model for the retail location and the item category by selecting from and weighting the multiple types of driver data for the retail location and the item category;
a baseline calculator configured to determine baseline sales based on the historical sales data using the model, and remove the baseline sales from the recent sales data for the given time period in the past;
a seasonal effects analyzer configured to remove seasonal influences from the recent sales data based on the model;
a local disruptions analyzer configure to remove influences of localized disruptions from the recent sales data based on the model; and
a trend attributer configured to:
extract, from the recent sales data for the retail location and the item category over the given time period, one or more trends associated with item sales;
access a demand forecast for the given time period, the retail location, and the item category; and
automatically analyze the one or more trends and the demand forecast to identify quantifiable factors associated with one or more of the multiple types of driver data that are attributable to deviations of the one or more trends from the demand forecast for the given time period;
wherein in response to receiving feedback indicating to adjust a respective model generated for at least one combination of retail store and item category identified within the landing table, the modeling environment is further configured to re-initiate the sales analysis process for the at least one combination of the retail store and the item category, the re-initiation including to adjust the respective model by at least one of including different driver data types in the model and providing different weights for the driver data types;
a demand forecaster configured to, based on the quantifiable factors for the relevant period of time in the past, generate an updated prediction of sales of items of the item category at the retail location for the future period of time; and
a dashboard application configured to receive an input defining the relevant period of time and a selection of the retail location and provide a display indicating at least one of the updated prediction of sales or the one or more trends.

12. The system of claim 11, further comprising communicating a report to a planner dashboard, the report including at least one of the updated prediction of sales or the one or more trends and communicating a change to a strategic plan for the retail enterprise for the future period of time.

13. The system of claim 12, wherein the change to the strategic plan comprises adjusting one or more of item pricing, labor distribution between one or more retail store locations, labor distribution within a retail store location, vendor purchasing levels, inventory positioning, sales and promotions, and planograms.

14. The system of claim 11, wherein the seasonal influences are removed from the recent sales data after the baseline sales are extracted and before removing the influences of localized disruptions.

15. The system of claim 11, wherein the adjusted model is tested before reinitiating the sales analysis process.

16. The system of claim 11, wherein the model engine utilizes a plurality of models customized to each combination of retail location and item category, the model comprising unique weightings of driver data.

17. A retail enterprise system comprising a plurality of geographically dispersed retail stores of a retail enterprise in communication with a retail enterprise computing system, the retail enterprise computing system comprising:
a retail analysis platform configured to:
automatically ingest data from a plurality of heterogeneous data sources having different data formats to a landing table, the data including multiple types of driver data indicative of internal and external factors that affect sales performance for the plurality of geographically dispersed retail stores, and sales data comprising historical sales data and recent sales data for the plurality of geographically dispersed retail stores for a given time period;

automatically extracting and cleaning the data from the landing table, the automatic extracting and cleaning comprising converting the different data formats of the data to a consistent format and organizing the data by retail store, item category, and the given time period;

access a demand forecast for the given time period; and process the data to produce a trend report by:
  determining baseline sales for all retail stores for the given time period based on the historical sales data;
  removing the baseline sales for the given time period from the recent sales data for the given time period;
  breaking down the recent sales data and applying a unique model to each combination of retail store and item category identified within the landing table, wherein each unique model is generated by selecting from and weighting the multiple types of driver data for the retail store and the item category, wherein each unique model operates to:
    remove effects of seasonal changes in sales, based on the historical sales data and the driver data;
    remove effects of localized disruptions, based on the driver data; and
    extract a trend after the baseline sales, the seasonal changes, and the localized disruptions are removed from the recent sales data; and wherein in response to receiving feedback indicating to adjust a respective unique model applied to at least one combination of retail store and item category identified within the landing table, adjusting the respective unique model for re-application to the at least one combination of the retail store and the item category by at least one of including different driver data types in the model and providing different weights for the driver data types;

for each combination of retail store and item category, analyzing the trend and the demand forecast to identify deviations that are attributable to one or more of the multiple types of driver data; and generating the trend report for each combination of retail store and item category identifying quantifiable factors associated with the identified types driver data; and a strategic planning platform comprising a planner dashboard, the strategic planning platform in communication with one or more administrator computing devices, the strategic planning platform configured to:
  receive trend reports from the retail analysis platform;
  display visualizations of the trend reports on the planner dashboard;
  receive instructions from the one or more administrator computing devices to modify a strategic plan for the retail enterprise;
  communicate instructions to one or more of a supply chain manager, a pricing manager, and a labor manager to implement the modified strategic plan; and
  communicate feedback, including the feedback indicating to adjust a respective unique model, to at least one of a developing and testing environment and a demand forecaster.

18. The system of claim 11, further comprising an exceptions reporting module configured to provide an alert when there is a major deviation between actual sales performance and a forecasted demand for a given period of time, the alert comprising the feedback indicating to adjust the respective unique model applied to the at least one combination of the retail store and the item category.

19. The retail enterprise system of claim 17, wherein an exceptions reporting module determines that a major deviation exists between actual sales performance and forecasted demand for a given period of time, and in response, operates to provide an alert, the alert comprising the feedback indicating to adjust the respective unique model applied to the at least one combination of the retail store and the item category.

20. The method of claim 1, wherein selecting from and weighting the multiple types of driver data for the retail store and the item category comprises:
  selecting, from the multiple types of driver data, a first set of driver data types and weighting the first set of driver data types for the retail store and the item category.

21. The method of claim 20, wherein adjusting the respective model for the retail store and the item category by at least one of including different driver data types in the respective model and providing different weights for the driver data types comprises at least one of:
  reselecting, from the multiple types of driver data, a second set of driver data types different from the first set of driver data types, and weighting the second set of driver data types; or
  reweighting at least one weight associated with the first set of driver data types.

* * * * *